US010979572B1

(12) United States Patent
Dorrance et al.

(10) Patent No.: US 10,979,572 B1
(45) Date of Patent: *Apr. 13, 2021

(54) DIRECTED CUSTOMER SUPPORT

(71) Applicant: Wells Fargo Bank, N.A., San Francisco, CA (US)

(72) Inventors: Benny F. Dorrance, Urbandale, IA (US); Eduardo D. Dela Torre, Oakland, CA (US); Ross Leone, Pleasant Hill, CA (US); Wayne Barakat, Novato, CA (US); Christopher P. Clausen, Novato, CA (US); Charles Cowell, Dublin, CA (US); Jeffrey A. Cornman, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/703,322

(22) Filed: Dec. 4, 2019

Related U.S. Application Data

(63) Continuation of application No. 15/160,535, filed on May 20, 2016, now Pat. No. 10,511,717.

(51) Int. Cl.
*H04M 3/00* (2006.01)
*H04M 3/523* (2006.01)
(Continued)

(52) U.S. Cl.
CPC ....... *H04M 3/5235* (2013.01); *H04M 3/2281* (2013.01); *H04M 3/5191* (2013.01); *H04W 4/14* (2013.01)

(58) Field of Classification Search
CPC .. H04M 3/5175; H04M 3/523; H04M 3/5183; H04M 3/5191; H04M 3/5166;
(Continued)

(56) References Cited

U.S. PATENT DOCUMENTS 8,332,765 B2 12/2012 Ergan et al.
8,452,706 B1 * 5/2013 Moadus ................. G06Q 40/02
705/40
(Continued)

FOREIGN PATENT DOCUMENTS

CN 103257879 A 8/2013
EP 2608041 A1 6/2013

OTHER PUBLICATIONS

"U.S. Appl. No. 15/160,535, Examiner Interview Summary dated Mar. 19, 2019", 3 pgs.
(Continued)

*Primary Examiner* — Rasha S Al Aubaidi
(74) *Attorney, Agent, or Firm* — Schwegman Lundberg & Woessner, P.A.

(57) ABSTRACT

Various examples are directed to systems and methods for directed customer support. An analytics system may receive support communication data describing a support communication regarding a user account received from a user computing device and determine a subject of the support communication. The analytics system may select a response medium based at least in part on the subject and generate a response message based at least in part on the subject.

21 Claims, 7 Drawing Sheets

(51) Int. Cl.
*H04W 4/14* (2009.01)
*H04M 3/51* (2006.01)
*H04M 3/22* (2006.01)

(58) Field of Classification Search
CPC . H04M 3/5232; H04M 3/5233; H04M 3/5235
USPC .......................... 379/265.01–265.02, 265.09,
379/265.12–265.13
See application file for complete search history.

(56) References Cited

U.S. PATENT DOCUMENTS

| | | | |
|---|---|---|---|
| 8,593,971 B1 | 11/2013 | Bryant et al. | |
| 8,719,945 B2 | 5/2014 | Birtwhistle et al. | |
| 8,774,781 B1 | 7/2014 | Speiser et al. | |
| 8,984,390 B2 | 3/2015 | Aymeloglu et al. | |
| 8,989,368 B1 | 3/2015 | Rivier et al. | |
| 9,848,082 B1* | 12/2017 | Lillard ................ | H04M 3/5231 |
| 10,511,717 B1 | 12/2019 | Dorrance et al. | |
| 2006/0062376 A1* | 3/2006 | Pickford ............. | H04M 3/5183 |
| | | | 379/265.12 |
| 2014/0161249 A1 | 6/2014 | Tolksdorf | |
| 2015/0106708 A1 | 4/2015 | Monte et al. | |
| 2016/0253910 A1 | 9/2016 | Fisher | |
| 2016/0350860 A1* | 12/2016 | Dintenfass ............. | G06Q 40/06 |

OTHER PUBLICATIONS

"U.S. Appl. No. 15/160,535, Examiner Interview Summary dated Jun. 21, 2019".
"U.S. Appl. No. 15/160,535, Final Office Action dated Dec. 13, 2018", 16 pgs.
"U.S. Appl. No. 15/160,535, Non Final Office Action dated Feb. 8, 2018", 17 pgs.
"U.S. Appl. No. 15/160,535, Non Final Office Action dated Mar. 20, 2019".
"U.S. Appl. No. 15/160,535, Notice of Allowance dated Aug. 14, 2019", 5 pgs.
"U.S. Appl. No. 15/160,535, Notice of Non-Compliant Amendment dated Jun. 14, 2018".
"U.S. Appl. No. 15/160,535, Response filed Mar. 13, 2019 to Final Office Action dated Dec. 13, 2018", 16 pgs.
"U.S. Appl. No. 15/160,535, Response filed May 7, 2018 to Non Final Office Action dated Feb. 8, 2018", 15 pgs.
"U.S. Appl. No. 15/160,535, Response filed Jun. 20, 2019 to Non Final Office Action dated Mar. 20, 2019", 13 pgs.
"U.S. Appl. No. 15/160,535, Response filed Aug. 14, 2018 to Non Final Office Action dated Feb. 8, 2018", 15 pgs.

* cited by examiner

DIRECTED CUSTOMER SUPPORT

CROSS-REFERENCE TO RELATED APPLICATION

This application is a continuation of U.S. patent application Ser. No. 15/160,535, filed May 20, 2016, which is incorporated by reference herein in its entirety.

TECHNICAL FIELD

Embodiments described herein generally relate to directed customer support, for example and without limitation, routing and responding to customer support communications.

BACKGROUND

Retail institutions provide customer support by telephone by different methods including telephone, web page, and web application.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
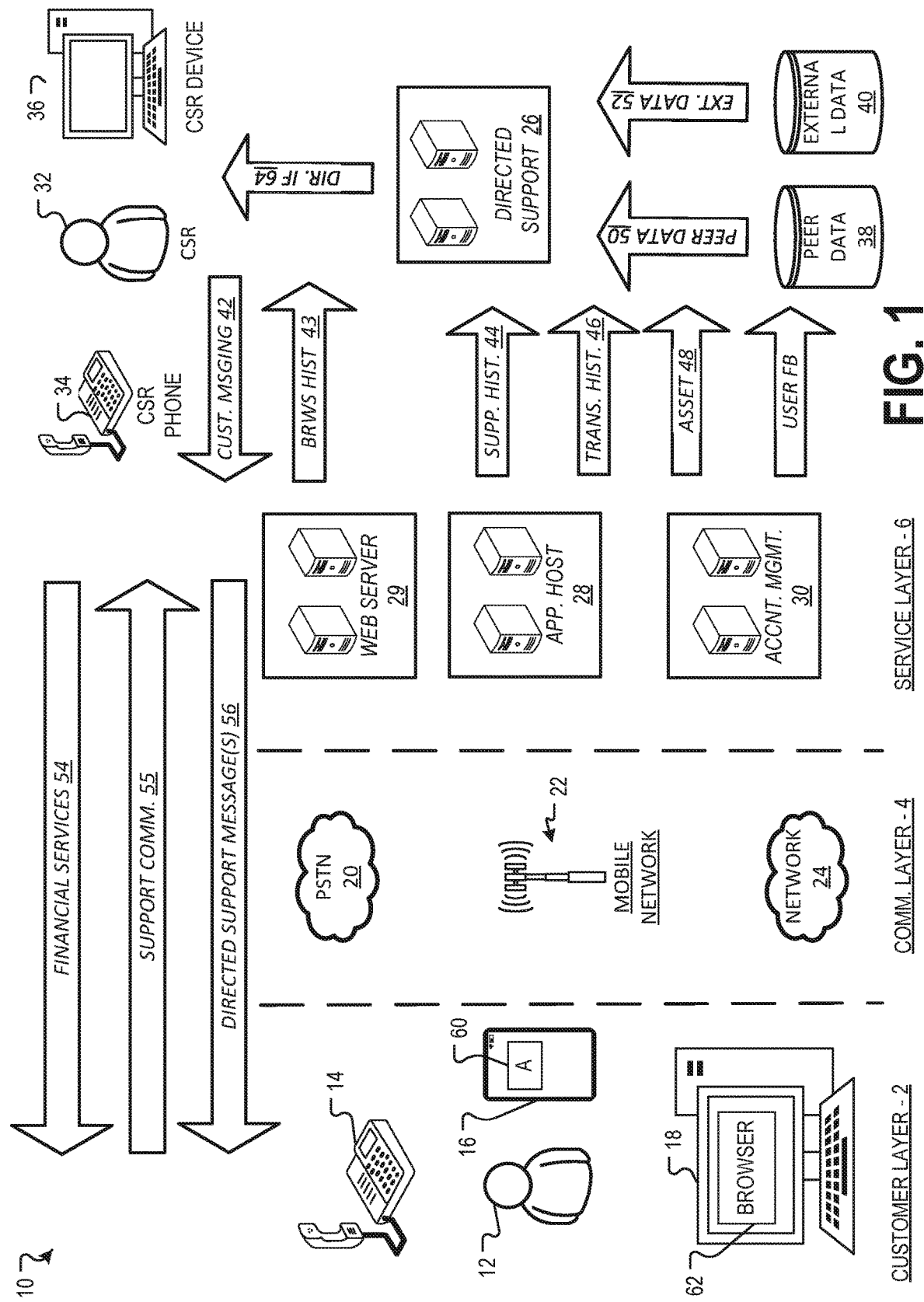
FIG. 1 is a diagram showing one example of an environment for providing directed customer support.

Various examples described herein include a directed customer support system, also referred to as a directed support system. A directed support system may include hardware and/or software components for providing directed customer support, such as, to customers of a financial institution.

The directed support system may receive a support communication from a customer. The support communication may be a telephone call, an electronic chat request, a short message service (SMS) or text message, electronic mail (e-mail), etc. The support communication may be a request from the customer for help or other support related to a financial product. For example, the customer may request information about fees charged to the customer's account, about the clearance of a transaction to the customer's account, etc. Fees may include fee transactions in which fees are charged to the customer's account. Fee transactions, for example, may include debits to the customer's account to cover assessed fees.

The directed support system may determine a subject of the support communication, for example, utilizing customer data describing the customer either alone or in conjunction with the support communication itself. Using the subject of the support communication, the directed support system may select a medium for responding and generate a response message. The response medium may be, for example, a telephone call, an electronic chat message or request, an SMS or other text message, an e-mail, etc. The response message may be provided directly to the customer, and/or to a customer support representative (CSR) who may assist the customer.

The directed support system may determine the subject of a support communication by analyzing customer data describing the customer that sent the support communication. For example, the directed support system may consider support history data describing previous support communications received from the customer, browsing history data describing visits by the customer to a website of the implementing institution, asset data describing one or more accounts or other assets of the customer held by the financial institution, transaction history data describing one or more transactions on the user's account, etc.

In one example, a customer of the financial institution may make a phone call to a customer support representative. The directed support system may consider customer data to determine a subject of the phone call. For example, if the customer's account includes one or more recent fee transactions, such as for overdraft fees, and the user's browsing history data indicates that the user has recently performed a web search regarding penalty fees, the directed support system may determine that the subject of the support call is the penalty fee. In some examples, the directed support system selects a telephone call as the response medium. The directed support system may route the initial telephone call to an appropriate CSR and/or request that the CSR call the customer. The directed support system may also be programmed to provide the CSR system with the response message via a customer interface. The customer interface may describe, the customer, the subject of the call, and/or other data.

FIG. 1 is a diagram showing one example of an environment 10 for providing directed customer support. The environment 10 includes a customer layer 2, a communications layer 4 and a service layer 6. The service layer 6 may be configured to provide and/or support financial services 54 and directed support messages 56 to the customer layer 2. In the example of FIG. 1, the service layer 6 may be configured to provide and support financial services to the customer layer 2, although the systems and methods described herein may be used to provide directed support in different business contexts.

The customer layer 2 may include a customer 12 and various devices 14, 16, 18 that may be used by the customer 12 to access the services 54, send support communications 55 and/or receive directed support messages 56 from the service layer 6. For example, the customer layer 2 may include a telephone 14, a computing device 18 and/or a mobile computing device 16. The telephone 14 may be or include any suitable device for placing a phone call, for example, via a public switched telephone network (PSTN)

20. The computing device 18 may be any computing device suitable for receiving financial services 54, receiving directed support messages 56, and/or sending support communications 55. Examples of the computing device 18 may include a desktop computer, a laptop computer, etc. In the example of FIG. 1, the computing device 18 executes a web browser 62. The mobile computing device 16 may also be any computing device suitable for receiving services 54, receiving directed support messages 56, and/or sending support communications 55. In some examples, the mobile computing device 16 may be configured for communication via a mobile network 22 to access either a data network 24 and/or the PSTN 20. Example mobile computing devices 16 may include smart phones, tablet computers, laptop computers, smart watches, etc. In the example of FIG. 1, the mobile computing device 16 executes a financial services application 60 that may be utilized to access various systems of the service layer 6.

The customer 12 may utilize the telephone 14, mobile computing device 16 and/or computing device 18 to initiate support communications 55, access financial services 54, and/or access directed support messages 56 from the service layer 6 in any suitable manner. For example, telephone 14 may be used to place one or more phone calls to the service layer 6 (e.g., to a customer support representative (CSR) 32 described in more detail below). The mobile computing device 16 and/or the computing device 18 may be utilized, in some examples, to execute a financial services application 60. The financial services application 60 may be a client-side and/or web application suitable for accessing one or more financial services of a financial institution. For example, the financial services application 60 may be in communication with various systems of the service layer 6, as described herein. Computing device 18 may execute a browser 62 (e.g., a web browser) that may also be used to access services 54 and support messages 56 as described herein. In FIG. 1, the mobile device 16 is shown executing the financial services application 60 and the computing device 18 is shown executing the browser 62. In various examples, however, the computing device 18 may execute a financial services application, such as 60, and the mobile computing device 16 may execute a browser 62.

The communication layer 4 may include various media that may facilitate communication between the customer layer 2 and the service layer 6. The communication layer 4, for example, may include the PSTN 20. For example, the customer 12 may utilize telephone 14 and/or mobile computing device 16 to access the service layer 6 (e.g., a CSR 32 via a CSR telephone 34) via the PSTN 20. The mobile network 22 may be configured to facilitate wireless voice and/or data communication between the mobile computing device 16 and various systems of the service layer 6. A data network 24 may include one or more wired and/or wireless data networks, such as, for example, local area networks (LANs), wide area networks (WANs), etc. In some examples, the network 24 may include the Internet. In some examples, the components 20, 22, 24 of the communication layer 4 may operate together. For example, a mobile computing device 16 may utilize the mobile network 22 to access the data network 24 and/or the PSTN 20. Also, in some examples, the mobile computing device 16 and/or the computing device 18 may access the PSTN 20 via the data network 24, for example, utilizing a Voice over IP (VoIP) connection.

The service layer 6 may include various systems and components for providing and/or supporting the provision of financial services 54 to the customer layer 2, receiving the support communications 55 and/or providing directed support messages 56. For example, the service layer 6 may include a web server 29, an application host system 28, an account management system 30, and a directed support system 26.

The account management system 30 may be configured to manage transactions to user accounts including, for example, deposits, withdrawals, balance transfers, payments, etc. For example, the account management system 30 may initiate, track, and/or otherwise facilitate account transactions. The account management system 30 may comprise one or more or more computing devices, such as servers, configured to operate as described herein. Computing devices making up the account management system 30 may be located at a single geographic location and/or may be distributed across multiple geographic locations. In some examples, the account management system 30 may be implemented in a "cloud computing" environment or as a "software as a service" (SaaS). For example, at least some of the operations of the account management system 30 may be performed by a group of computing devices, with these operations being accessible via a network and/or via one or more appropriate interfaces (e.g., an Application Program Interface (API)).

A web server 29 may be configured to manage communications with the customer layer 2 via the Internet or other suitable medium. For example, the web server 29 may be configured to communicate with the browser application 62 to provide or support financial services 54, receive support communications 55 and/or send directed support messages 56 to the computing device 18 and/or the mobile computing device 16. The web server 29 may comprise one or more or more computing devices, such as servers, configured to operate as described herein. Computing devices making up the web server 29 may be located at a single geographic location and/or may be distributed across multiple geographic locations. In some examples, the web server 29 may be implemented in a "cloud computing" environment or as SaaS. For example, at least some of the operations of the web server 29 may be performed by a group of computing devices, with these operations being accessible via a network and/or via one or more appropriate interfaces (e.g., an API).

An application host system 28 may be configured to communicate with the financial services application 60 executing at a mobile computing device 16 and/or the computing device 18 to provide or support financial services 54, receive support communications 55 and/or send directed support messages 56 to the computing device 18 and/or the mobile computing device 16. The application host system 28 may comprise one or more or more computing devices, such as servers, configured to operate as described herein. Computing devices making up the application host system 28 may be located at a single geographic location and/or may be distributed across multiple geographic locations. In some examples, the application host system 28 may be implemented in a "cloud computing" environment or as SaaS. For example, at least some of the operations of the application host system 28 may be performed by a group of computing devices, with these operations being accessible via a network and/or via one or more appropriate interfaces (e.g., an API).

The service layer 6, in some examples, also comprises customer support representative (CSR) equipment such as one or more CSR phones 34 and one or more CSR computing devices 36. A CSR 32 may utilize the CSR telephone 34 and/or the CSR computing device 36 to provide and/or support financial services 54 at the customer layer 2, to send directed support messages 56 to the customer layer 2 and/or to receive support communications 55 from the customer layer 2. For example, the customer layer 2 and the CSR 32 may be connected via a telephone call, for example, between the CSR telephone 34 and the user telephone 14 and/or between the mobile computing device 16 and the CSR telephone 34. The CSR 32 may provide and/or support financial services 54, for example, by receiving requests for transactions on accounts of the customer 12, and providing the requests to the account management system 30 for execution. In some examples, the CSR 32 may receive support communications 55 from the customer layer 2 in the form of phone calls between the customer 12 (e.g., device 16 or 14) and the CSR phone 34. The customer 12 may request support by voice over the telephone call. In some examples, the CSR 32 may receive support communications 55 from the customer 12 in the form of a chat or other exchange of textual messages (e.g., chat and/or SMS messages) between the customer 12 (e.g., via device 16 and/or device 18) and the CSR computing device 36.

Figure 2:
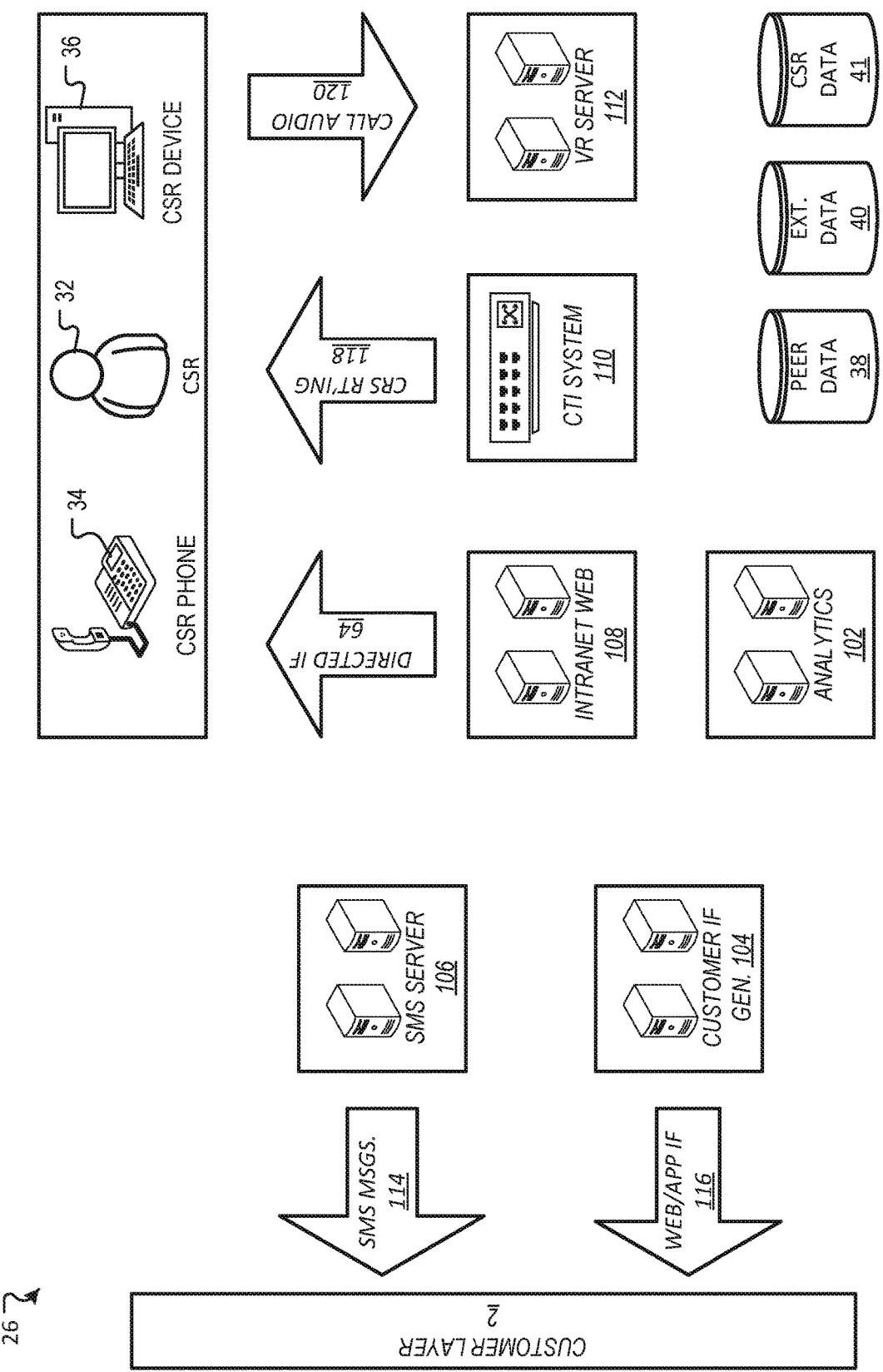
FIG. 2 is a diagram showing an example of the directed support system of FIG. 1 showing additional details.

The service layer 6 also comprises the directed support system 26, which may include various components, for example, as described in more detail with respect to FIG. 2. For example, the directed support system 26 may comprise one or more or more computing devices, such as servers, configured to operate as described herein. Computing devices making up the directed support system 26 may be located at a single geographic location and/or may be distributed across multiple geographic locations. In some examples, the directed support system 26 may be implemented in a "cloud computing" environment or as SaaS. For example, at least some of the operations of the directed support system 26 may be performed by a group of computing devices, with these operations being accessible via a network and/or via one or more appropriate interfaces (e.g., an API).

The directed support system 26 may be configured to perform directed customer support as described herein. For example, the directed support system 26 may receive support communications 55 from the customer layer 2 and/or may receive data describing customer communications 55 from other components of the service layer 6. For example, support communications 55 received from the customer 12 via the financial services application 60 may be received by the application host system 28. The application host system 28 may forward the received support communications 55 to the directed support system 26 and/or provide to the directed support system 26 data describing the received support communications 55. Similarly, support communications 55 received through a web browser 62 may be received by the web server system 29. The web server system 29 may forward the support communications 55 and/or data describing the support communications 55 to the directed support system 26.

In some examples, the directed support system 26 may determine a subject of a received support communication 55. The directed support system 26 may determine a subject of a support communication 55 considering various customer data. Customer data may be received, for example from the web server system 29, the application host system 26, the account management system 30, the CSR computing device 36 and/or various databases or data stores 38, 40.

Browsing history data 43 may include a record of interface pages viewed by the customer 12. The interface pages may be web pages served by the web server system 29 to the browser 62 and/or application pages served by the application host system 28 to the financial services application 60. For example, the browsing history data 43 may include an indication of a page or pages visited by the customer 12 and a description of content included on the accessed pages. In some examples, browsing history data 43 may also describe queries made by the user, for example to the web service system 29 via browser 62 and/or to the application host system 28 via the financial services application 60.

Support history data 44 may describe previous support communications received from the customer 12 and may include, for example, dates and times for the previous communications as well as a subject of the support communications, for example, determined by the directed support system 26 or an analytics system thereof. In some examples, support history data 44 may include records and/or transcripts of telephone calls placed from the customer layer 2 to a CSR telephone 34, e-mails sent from the customer layer 2, chat sessions requested from the customer layer 2, for example, through the financial services application 60 or web browser 62, text messages requested by the customer layer 2, etc. Support history data 44 may be received from the web server system 29, the application host system 28 and/or the CSR computing device 36. Support history data 44 received from the web server system 29 may include, for example, a history of support communications 55 initiated through the web browser 62. Similarly, support history data 44 received from the application host system 28 may include a history of support communications 55 initiated through the financial services application 60.

In some examples, the directed support system 26 may also receive transaction history data 46, for example, from the account management system 30. Transaction history data 46 may describe one or more transactions on one or more financial accounts of the customer 12. Also, in some examples, the directed support system 26 may receive customer product set data 48, for example, from the account management system 30. The customer product set data 48 may describe one or more accounts or other financial products held by the customer 12 at a financial institution implementing the service layer 6. In some examples, the directed support system may also receive user feedback data. For example, the user may be prompted to provide information about the support communication by SMS or other text message, by e-mail, by interactive voice response (IVR), etc. The user's responses may be the user feedback data and/or be included in the user feedback data.

In some examples, customer data for determining the subject of a support communication may include peer data 50 and/or external data 52. Data 50, 52 may be received from any suitable source. Peer data 50 may be data describing customers similar to the customer 12. In some examples, peer data 50 may include support history data, transaction history data, and/or customer product set data describing peer customers that are similar to the customer 12. The directed support system 26 or other suitable system may select the peer customers for any particular customer 12. Peer customers may be, for example, customers with a similar product set as the customer 12, customers with a transaction history 46 similar to that of the customer 12, customers with a support history similar to the customer 12, customers at a similar stage-of-life as the customer 12, etc. External data 40 may include data about the customer 12 received from outside of the service layer 6 and may include, news stories about the customer 12, property tax or other public records regarding the customer 12, social media data describing social media use of the customer 12, etc. For example, peer data 50 may be stored at a peer database 38 that may be maintained by the directed support system 26 or another suitable system. External data 40 may be stored at an external database 40 maintained by the directed support system 26 or other suitable system. The analytics system 102 is also in communication with a CSR database or other data structure that links specific CSRs 32 to particular customer support topics. For example, the analytics system 102 may select a particular CSR 32 to respond to customer support communication based on the determined topic of the support communication, as described herein.

The directed support system 26 may also provide one or more directed support messages 56 to customer layer 2. Directed support messages 56 may be generated by the directed support system 26 by any suitable medium. For example, customer messages 42 may be provided to the customer layer 2 (e.g., to the financial services application 60 and/or the browser 62, etc.). Customer messages 42 may include, a text message provided via a chat session, SMS, etc., an e-mail message, etc. In some examples, directed support messages 56 may also be provided indirectly via the CSR 32. For example, the directed support system 26 may provide the CSR device 36 with a directed customer interface 64. In some examples, the directed support system 26 may populate the directed customer interface 64 with data describing the subject of a support communication 55 received from the customer layer 2. For example, the CSR 32 may refer to the directed customer interface 64, displayed at the CSR computing device 36, while communicating with the customer 12.

In some examples, as described herein, the directed support system 26 may also select the medium for the directed support messages 56, for example, as described herein. In some examples, the directed support system 26 may be configured to route a support communication 55. For example, the directed support system 26 may direct a support communication 55 to a CSR 32 (e.g., via a CSR telephone 34 and/or CSR computing device 36), to a particular CSR 32 trained for or otherwise suited for the support communication 55, to a web page including information related to the subject of the communication 55, etc. Although FIG. 1 shows one instance of the components of the environment 10, some examples may include multiple instances. For example, there may be multiple customers 12, CSRs, 32, etc.

FIG. 2 is a diagram showing an example of the directed support system 26 showing additional details. In the example of FIG. 2, the directed support system comprises an analytics system 102, a customer interface generator 104, a short message service (SMS) server 106, an intranet server 108, a computer telephony integration (CTI) system 110, and a voice recognition service 112. Peer database 38 and external database 40 are also shown. The various services and system of the directed support system 26 may comprise one or more or more computing devices, such as servers, configured to operate as described herein. Computing devices making up the components 102, 104, 106, 108, 110, 112 may be located at a single geographic location and/or may be distributed across multiple geographic locations. In some examples, the components 102, 104, 106, 108, 110, 112 may be implemented in a "cloud computing" environment or as SaaS. For example, at least some of the operations of the components 102, 104, 106, 108, 110, 112 may be performed by a group of computing devices, with these operations being accessible via a network and/or via one or more appropriate interfaces (e.g., an API). The example of FIG. 2 shows only one example configuration of the directed support system 26. Various examples of the directed support system 26 may include more, fewer, and/or different combinations of components. Each of the components 102, 104, 106, 108, 110, 112 of the directed support system. Also, in some examples, the functionality of more than one of the components 102, 104, 106, 108, 110, 112 may be incorporated into a single component.

The analytics system 102, in some examples, is configured to determine a subject of support communications, select a response medium, generate a response message, and/or send the response message, as described herein. Further details of the operation of the analytics system 102 are provided herein, for example, with respect to FIGS. 3-5. The customer interface generator 104 may generate customer user interfaces 116, such as graphical user interfaces, to be provided to the customer 12. For example, customer user interfaces 116 may be provided to the web server system 29 and/or the application host system 28 for provision to the customer layer 2. In some examples, customer user interfaces 116 generated by the customer interface generator 104 may incorporate one or more customer messages. For example, customer user interfaces may be a medium for providing directed support messages 56 to the customer 12. The customer user interface 116 may be of any suitable form. In some examples, the customer user interface 116 may comprise a page or other document including information related to a subject of a support communication. In some examples, the customer user interface 116 may comprise a chat window or other interface facilitating support communications between the customer layer 2 and a CSR 32.

The SMS server 106 may be configured to send SMS, or other similar text messages to the customer layer (e.g., to the mobile computing device 16). The SMS server 106 may send messages, for example, via the mobile network 22. An intranet server 108 may be configured to generate and provide the directed interface 64 to the CSR 32, for example, via a CSR device 36. The CTI system 110 may be utilized to rout a support communication 55 to a suitable CSR 32, for example, as described herein. For example, the CTI system 110 may generate CSR routing data 118 and provide the CSR routing data 118 to the CSR 32 (e.g., via the CSR phone 34 and/or the CSR computing device 36. CSR routing data 118 may include a customer support message and/or data describing the customer support message. In some examples, the CTI system 110 may also receive from the CSR telephone 34 and/or CSR computing device 36 data describing an incoming support communication 55. For example, when the customer 12 places a phone call to a CSR telephone 34, data indicating the receipt of the phone call as well as data identifying the customer/caller, if such data is available, may be provided by the CTI system 110 to the analytics system. A Voice Recognition server 112 may receive and/or analyze support history data received directly or indirectly from the CSR 32. For example, the voice recognition server 112 may generate transcripts and/or perform other suitable processing on audio from customer call audio data 120 received directly or indirectly from a CSR phone 34 and/or CSR computing device 36.

Figure 3:
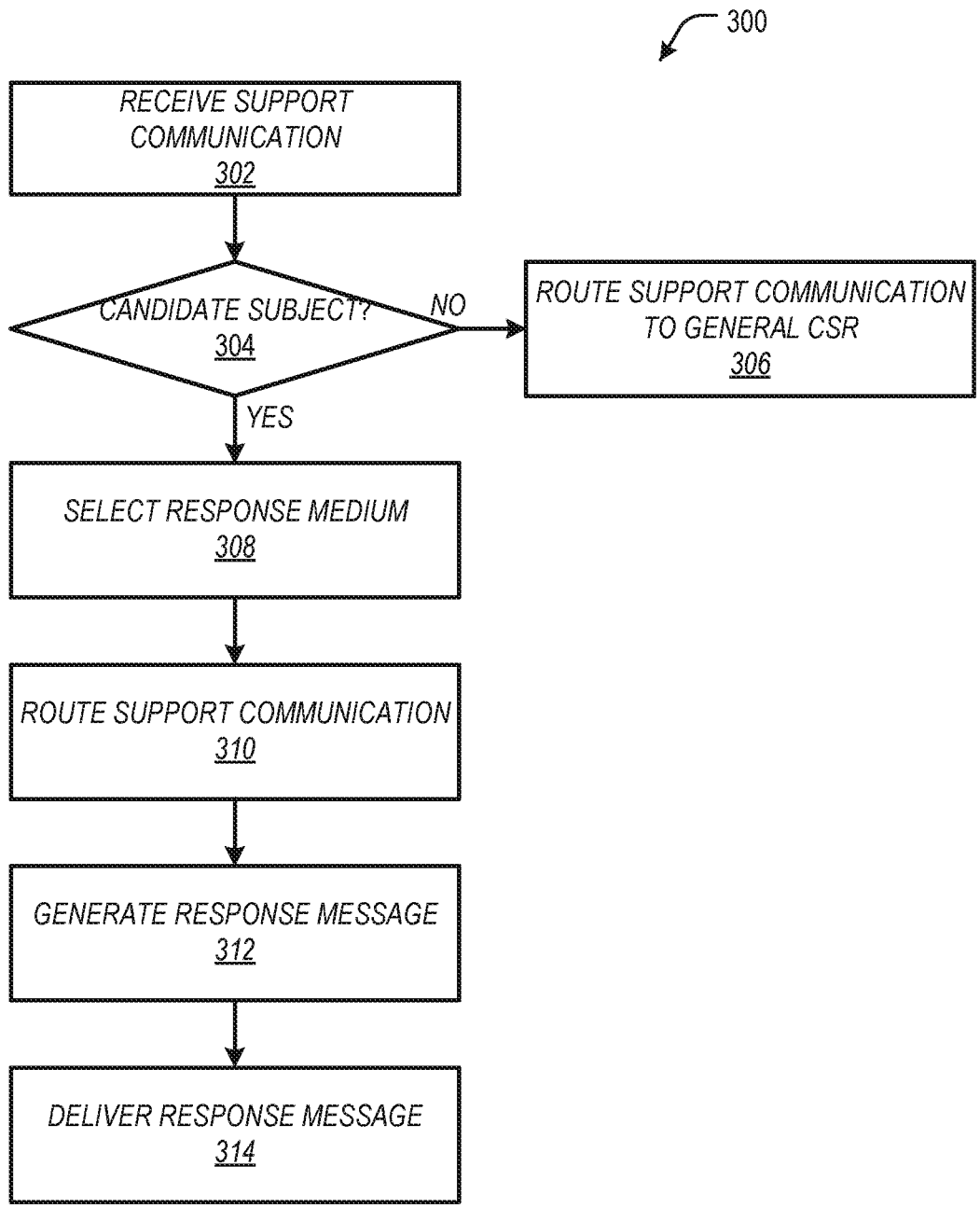
FIG. 3 is a flow chart showing one example of a process flow that may be executed by the analytics system to generate directed customer support.

FIG. 3 is a flow chart showing one example of a process flow 300 that may be executed by the analytics system (e.g., the analytics system 102) to generate directed customer support. At action 302, the analytics system may receive a support communication and/or data describing a support communication received by another component of the service layer (e.g., a web server system, an application host system, a CSR 32, etc.). The support communication may be a phone call, an e-mail, a text message, a chat request, etc.

At action 304, the analytics system 102 may determine a candidate subject for the support communication. Additional details describing how the analytics system may determine a candidate subject for the support communication are provided herein, for example, with reference to FIG. 4.

If no candidate subject can be determined for the support communication, the analytics system may, at action 306, route the support communication to a general CSR, for example. For example, the analytics system 102 may be configured to generate a candidate subject for the received support communication and a confidence score, where the confidence score indicates the likelihood that the returned subject is correct. The analytics system 102 may determine that it is not possible to assign a subject to a support communication, for example, Additional details of confidence scores are provided herein. A general CSR 32 may be a CSR 32 who is available to answer general requests and/or direct a customer to an alternate CSR or other response medium. In some examples, the analytics system may maintain or have access to a database or other data structure indicating CSRs classified as general and/or otherwise available to respond to a support communication without a candidate subject.

If a candidate subject for the support communication is determined, the analytics system may, at action 308, select a response medium. Example response mediums include telephone calls, electronic chat messages or requests, SMS or other text messages, e-mails, etc. In some examples, if the response medium is a telephone call to be placed to the customer and/or routing the support communication to a CSR telephone, the response medium may be a directed interface, such as the interface 64 described herein. Additional details describing how the analytics system may select a response medium are provided herein, for example, with reference to FIG. 5.

Optionally, at action 310, the analytics system may route the support communication, for example, based on the candidate subject. In some examples, the analytics system may route the support communication to a CSR. For example, the analytics system may maintain or have access to a database or other data structure listing CSRs that are trained or otherwise appropriate for responding to support communications having a particular subject. The analytics system may select a CSR associated with the candidate subject at the database. The manner in which the analytics system routes the support communication may depend, for example, on the type of the support communication. For example, if the support communication is a phone call, the analytics system may, for example, send an instruction to the CTI system to route the phone call to an appropriate CSR. Also, for example, if the support communication is an SMS or other text message, the analytics system may instruct the SMS server to forward the support communication an appropriate CSR computing device.

At action 312, the analytics system may generate a response message. The response message may be according to the response medium selected at action 308. The analytics system may deliver the response message at action 314. Delivering the response message may include, for example, sending data to an SMS server, such as SMS server 106, for delivery to the customer layer as one or more SMS messages 114. In some examples, delivering the response message may include, for example, providing data for a customer-directed page to a customer interface generator system, such as customer interface generator 104. The customer interface generator 104 may deliver the customer-directed page to the customer layer, for example, via a financial services application and/or web browser. In some examples, delivering the response message may include sending an instruction to a CSR telephone and/or CSR computing device. The instruction may request that the CSR associated with the CSR telephone or CSR computing device place a phone call to the customer layer. Optionally, the instruction is accompanied by a request to an intranet server, such as server 108, to serve to the corresponding CSR computing device a directed interface, such as 64, including data for the response message. In some examples, delivering the response message may include sending to the customer layer 2 a text message 114, e-mail or other suitable communication including a hyperlink that, when launched, provides the customer 12 with a user interface page including the customer message.

In some examples, the analytics system may determine a subject for a support communication by comparing the customer data regarding the support communication and/or the customer who originated the support communication to data (e.g., from other customers) known to correspond to a particular topic. In some examples, the analytics system may determine if the customer data indicates a likely subject by applying a pattern-matching or scoring algorithm. According to a pattern-matching algorithm, the analytics system may compare the customer data to patterns of customer data that are known to correlate to particular support communication subjects. If the customer data matches a pattern corresponding to a particular subject at more than a threshold level, that subject may be assigned to the support communication. According to a scoring algorithm, the analytics system may score the customer data based on similarities to examples of customer data known to correlate to particular support communication subjects. If the score for a particular subject is greater than a threshold amount, the analytics system may return the pattern as a likely input subject. Other example algorithms or models that may be used to determine support communication subjects include neural network algorithms, evolutionary algorithms, etc. In some examples, the algorithm or model used to determine the subject of a support communication may also return a confidence score or other indication of how closely the returned subject matches the customer data. When a matching algorithm is used, for example, the confidence score may indicate a degree of correlation between the customer data describing the customer and customer data associated with a first subject.

In one example, the customer data may include data indicating that the customer has performed searches regarding mortgages through a web interface or application interface, such as interface 116. The customer data may also include data indicating that the customer has recently added a new user to his or her accounts (e.g., a new spouse). In this example, the pattern-matching or scoring algorithm may determine that the customer is interested in receiving financial services and/or support relating to the mortgage application process. In another example, the customer data may include data indicating that the customer has performed searches on the web or application interface regarding fees for allowing an account balance to drop below a minimum balance. The customer data may also include data indicating that the customer has been assessed one or more penalty fees for allowing an account balance to drop below a minimum, for example, within a threshold time. In this example, the pattern-matching or scoring algorithm may indicate that the customer is interested in receiving financial services and/or support relating to minimum balance fees.

Figure 4:
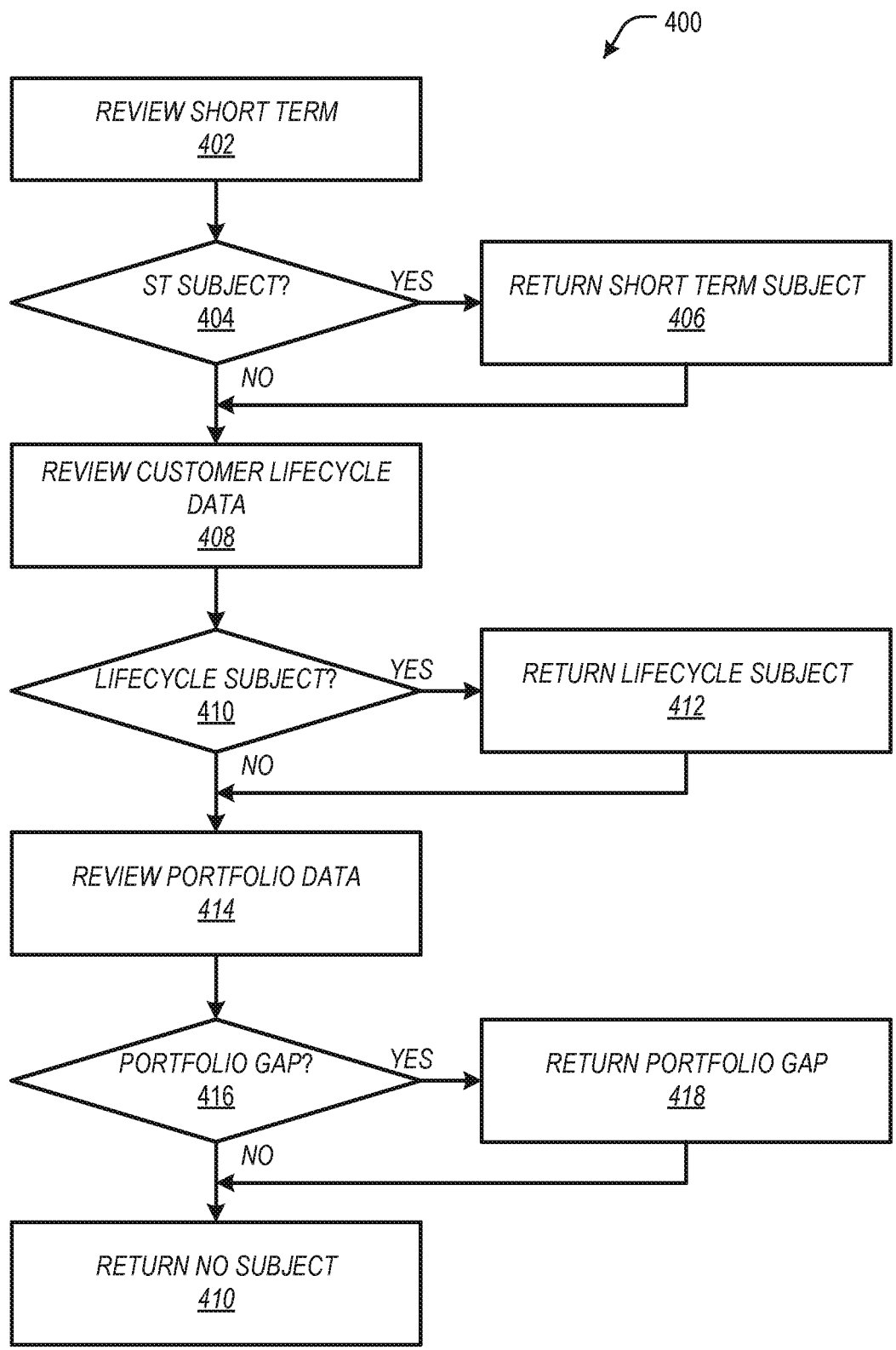
FIG. 4 is a flow chart showing one example of a process flow that may be executed by the analytics system to determine a subject for a support communication.

In some examples, the analytics system may identify one or more different categories of subjects for the support communication. For example, FIG. 4 is a flow chart showing one example of a process flow 400 that may be executed by the analytics system to determine a subject for a support communication. At action 402, the analytics system may review short term customer data, also referred to herein as short term data. Short term data may include any customer data that was received and/or describes events that occurred within a threshold time from the present. For example, short term data may include fresh data that is more likely to relate to the customer's current problem. The time threshold for short term data may be any suitable value including, for example, ten (10) minutes, one (1) hour, one (1) day, one (1) week, one (1) month, two (2) months, etc. In some examples, different time thresholds may be applied to different types of customer data. For example, customer product set data may be considered short term if it describes the customer's status within a matter of months (e.g., six (6) months). Other data, such as browsing history data, support history data, etc. may be considered short term if it is within a shorter threshold (e.g., seven (7) days) of the present.

At action 404, the analytics system 404 may determine if the short term data indicates a likely short term subject, for example, based on the short term data. For example, the analytics system may apply any suitable algorithm or model to the short term data, for example, any of the algorithms or models described herein or any other suitable algorithm or model. Considered short term data may include short term browsing history data and short term financial transaction data. Short term browsing history data may be a portion of the total browsing history data for the customer that was gathered within a threshold time period (e.g., on day, one week, one hour, etc.). Short term financial transaction data may describe transactions (e.g., financial transactions) made on the customer's account within the threshold time. A likely short term subject may exist if a subject is returned by the algorithm or model for the short term data, and, for example, the returned subject has a confidence score greater than a threshold confidence score. If a likely short term subject is detected at action 404, the analytics system may return the short term subject at 406. In some examples, the analytics system may terminate the process flow 400 after action 406, although in other examples, including the example shown in FIG. 4, the analytics system may continue and potentially return multiple topics for the support communication.

If no likely short term subject is found at action 404, the analytics system may, at action 408, review customer lifecycle data. Customer lifecycle data may be any suitable customer data indicating a life stage of the customer 12. Customer lifecycle data may include accounts held by the customer. In some examples, the analytics system may determine a lifecycle value for the customer. The lifecycle value may indicate be a stage of life for the customer. Lifecycle values may be expressed as an age or range of ages, a pending event (e.g., near retirement, college for children, etc.). The lifecycle value may be determined in any suitable manner. For example, a customer who holds a mortgage is likely at a different life stage that a customer having only a checking account. Also, in some examples, customer lifecycle data may include changes over time. For example, if the customer once had regular penalty fees, but has not had recent penalty fees, it may indicate that the customer is at a different, more mature life stage. In some examples, lifecycle data may indicate that particular subject of the support communication, or that a particular subject is more likely. For example, if support history data indicates that the customer has been searching for information about loans, and lifecycle data indicates that the customer has children nearing college age, lifecycle data may indicate that the subject of the support communication is, or is likely to be, related to education loans.

If, at action 410, the lifecycle data indicates that a lifestyle subject for the support communication is likely, or the lifecycle data in conjunction with the short term data indicates a likely subject (e.g., more likely, the analytics system may return that subject at action 412. If not, or, in some examples, in addition to returning the lifecycle subject, the analytics system may, at action 414, review portfolio data. Portfolio data may include data describing the customer products and/or accounts held by the customer, such as customer product set data 48. At action 416, the analytics system may determine if there is a gap in the customer's portfolio. A portfolio gap may indicate, for example, that the customer is likely to hold other accounts, for example, at other financial institutions. In some examples, the analytics system may compare portfolio data to the lifecycle data described above, for example, to determine what accounts and/or balances a customer is likely to have at the life stage of the customer. If a portfolio gap is identified, the analytics system may return a portfolio gap subject at action 418. When a portfolio gap is found, the analytics system may provide the customer with offer data describing an offered financial account. The offered financial account may be a potential financial account that the user might want or need based on the determined portfolio gap. For example, an offered financial account may be equivalent to an account that the analytics system determines that the customer is likely to hold at another institution (e.g., the portfolio gap). The offer data may be provided directly via a user interface served to a customer computing device and/or indirectly via a CSR.

If no gap is found and/or if no other potential subjects are found, the analytics system may return no subject at action 410. As illustrated by the process flow 400, in some examples, the analytics system may determine more than one subject for a support communication (e.g., a short term subject, a lifecycle subject, a portfolio gap, etc.). In examples where more than one subject is determined, the analytics system, in some examples, may generate and send response messages directed to two or more of the subjects, either as part of a common response or as distinct responses.

Figure 5:
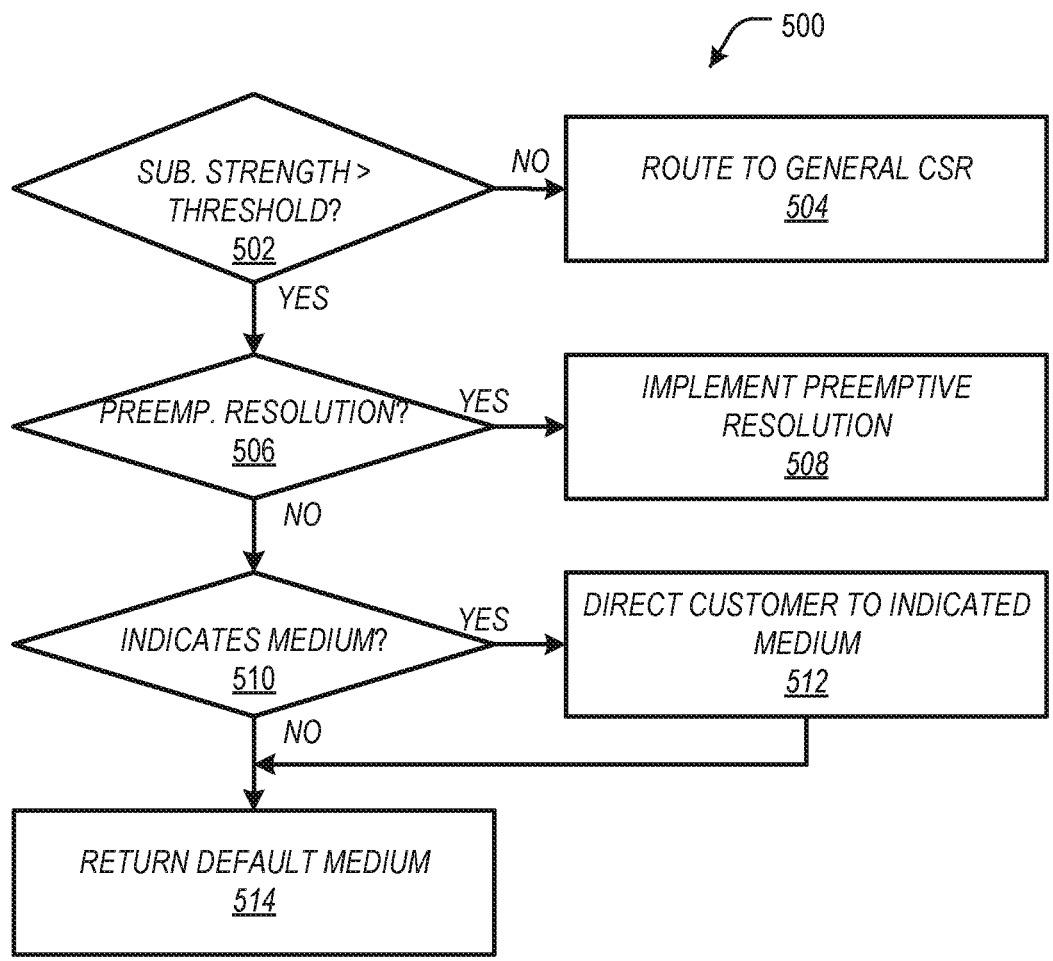
FIG. 5 is a flow chart showing one example of a process flow that may be executed by the analytics system to select a medium for the response message in response to a support communication.

FIG. 5 is a flow chart showing one example of a process flow 500 that may be executed by the analytics system to select a medium for the response message in response to a support communication. At action 502, the analytics system may determine if a confidence score for the support communication exceeds a threshold. If not, at action 504, the analytics system may route the support communication to a general CSR, for example, as described herein. In some examples, the analytics system may also provide the CSR with a directed interface indicating the likely subject.

If the subject strength is above a strength threshold, the analytics system may, at action 506, determine if a preemptive resolution is available. In some examples, the analytics system may determine that a preemptive resolution is available based at least in part on the customer data utilizing a pattern-matching and/or scoring algorithm, as described above. Also, in some examples, the analytics system may include a look-up table according to which certain states of customer data correspond to certain preemptive resolutions. For example, if the customer's password for accessing the financial services is locked, the preemptive response may be to reset the customer's password, for example, by sending the customer an message (e.g., e-mail or text message) with a hyperlink that, when activated, directs the customer to an interface page for selecting a new password. If the customer has recently received more than a threshold number of overdraft fees, the preemptive resolution may involve forgiving one or more of the overdraft fees.

A preemptive resolution may involve, for example, taking an action to address the customer's problem (as indicated by the subject of the support communication). For example, if the subject of the support communication is determined to relate to an inquiry about the status of a particular transaction, a preemptive resolution may include sending to the customer an indication the status. Also, for example, if the subject of the support communication is a penalty fee, a preemptive resolution may include forgiving the penalty fee, for example, by applying a credit transaction to the customer's account to cancel a previously fee transaction. In some examples, the analytics system may determine to forgive a penalty fee if the customer has incurred more than a threshold number of fee transactions, if the user has a balance with the financial institution above a threshold, etc. If a preemptive resolution is available, the analytics system may apply the preemptive resolution at action 508. In some examples, the preemptive resolution may be the response message, although in other examples, the analytics system may proceed from action 508 to action 510.

If no preemptive resolution is determined at action 506 and/or if the analytics system proceeds from action 508, it may, at action 510, determine if the subject of a support communication indicates a particular response medium. For example, a support communication about a mortgage application may be directed to a CSR associated with mortgages and/or the customer's application in particular. In some examples, a CSR database or other suitable data structure, such as the CSR database 41, may associate CSRs with particular topics.

Also, in some examples, when more than one subject is returned for a support communication, all returned subjects may be considered. For example, a short term subject for a customer at an early life stage may be routed to a general CSR. The same short term subject for a customer at a later life stage and/or having a more complex portfolio may be routed to a different CSR. If the subject indicates a response message medium, the analytics system may send the response message to the indicated medium at action 512. If no medium is called for, the analytics system may return a default medium at action 514 (e.g., a general CSR).

Figure 6:
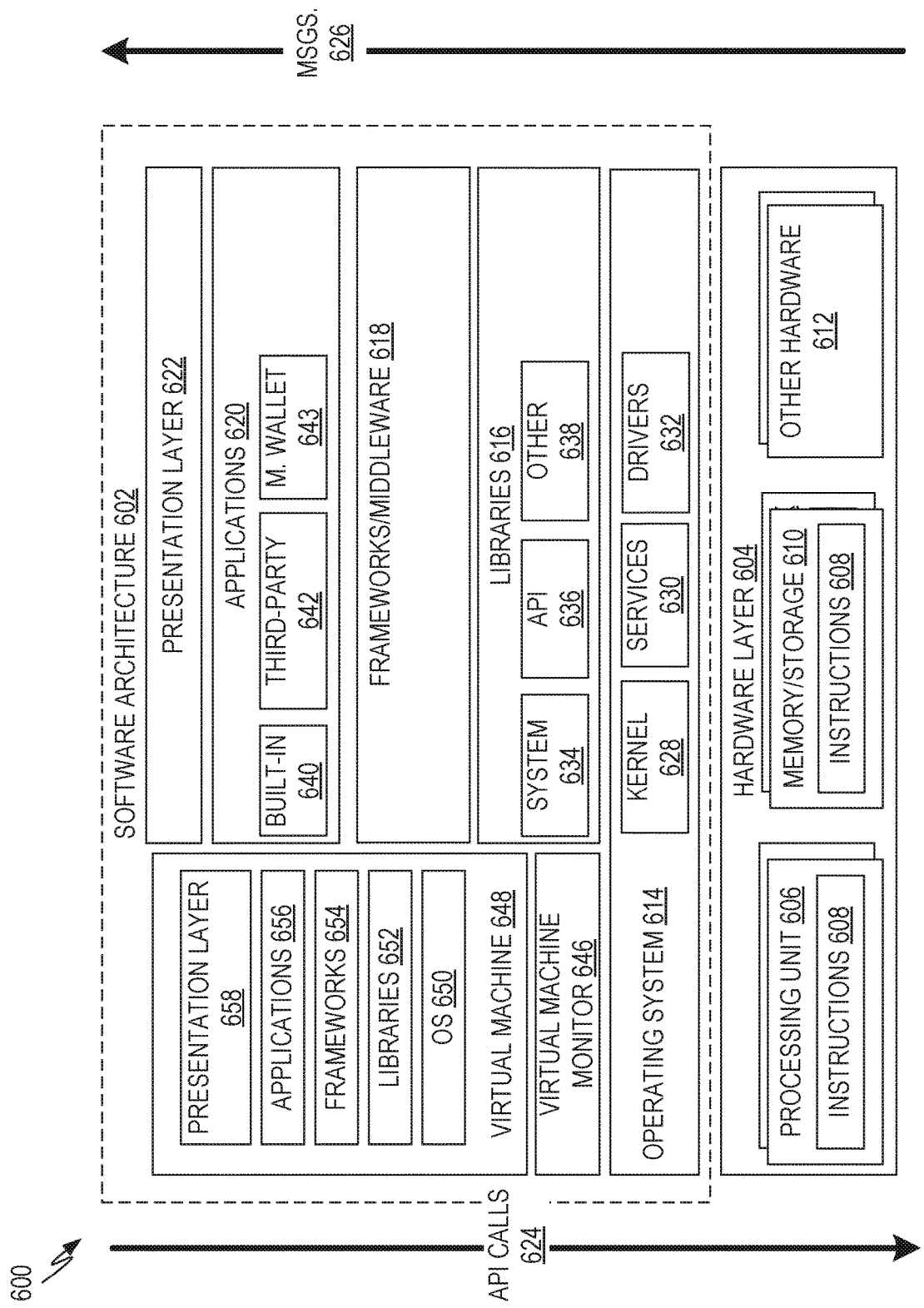
FIG. 6 is a block diagram showing one example of a software architecture for a computing device.

FIG. 6 is a block diagram 600 showing one example of a software architecture 602 for a computing device. The architecture 602 may be used in conjunction with various hardware architectures, for example, as described herein. FIG. 6 is merely a non-limiting example of a software architecture and many other architectures may be implemented to facilitate the functionality described herein. The software architecture 602 may be executed on hardware such as, for example, a mobile computing device 16, a computing device 18, all or part of any of the components of the service layer 6, etc. A representative hardware layer 604 is illustrated and can represent, for example, any of the above referenced computing devices. In some examples, the hardware layer 604 may be implemented according to the architecture 300 of FIG. 3 and/or the architecture 1000 of FIG. 10.

The representative hardware layer 604 comprises one or more processing units 606 having associated executable instructions 608. Executable instructions 608 represent the executable instructions of the software architecture 602, including implementation of the methods, modules, components, and so forth of FIGS. 1-2 and 4-8. Hardware layer 604 also includes memory and/or storage modules 610, which also have executable instructions 608. Hardware layer 604 may also comprise other hardware as indicated by other hardware 612 which represents any other hardware of the hardware layer 604, such as the other hardware illustrated as part of hardware architecture 1000.

In the example architecture of FIG. 6, the software 602 may be conceptualized as a stack of layers where each layer provides particular functionality. For example, the software 602 may include layers such as an operating system 614, libraries 616, frameworks/middleware 618, applications 620 and presentation layer 622. Operationally, the applications 620 and/or other components within the layers may invoke application programming interface (API) calls 624 through the software stack and receive a response, returned values, and so forth illustrated as messages 626 in response to the API calls 624. The layers illustrated are representative in nature and not all software architectures have all layers. For example, some mobile or special purpose operating systems may not provide a frameworks/middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system 634 libraries (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) may provide a higher-level common infrastructure that may be utilized by the applications 620 and/or other software components/modules. For example, the frameworks 618 may provide various graphic user interface (GUI)

functions, high-level resource management, high-level location services, and so forth. The frameworks 618 may provide a broad spectrum of other APIs that may be utilized by the applications 620 and/or other software components/modules, some of which may be specific to a particular operating system or platform.

The applications 620 includes built-in applications 640 and/or third party applications 642. Examples of representative built-in applications 640 may include, but are not limited to, a contacts application, a browser application, a book reader application, a location application, a media application, a messaging application, and/or a game application. Third party applications 642 may include any of the built in applications as well as a broad assortment of other applications. In a specific example, the third party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 642 may invoke the API calls 624 provided by the mobile operating system such as operating system 614 to facilitate functionality described herein. A mobile wallet application 643 may implement the functionality of the mobile wallet described herein. The mobile wallet application may be a built-in or third-party application.

The applications 620 may utilize built in operating system functions (e.g., kernel 628, services 630 and/or drivers 632), libraries (e.g., system 634, APIs 636, and other libraries 638), frameworks/middleware 618 to create user interfaces to interact with users of the system. Alternatively, or additionally, in some systems interactions with a user may occur through a presentation layer, such as presentation layer 644. In these systems, the application/module "logic" can be separated from the aspects of the application/module that interact with a user.

Some software architectures utilize virtual machines. For example, any of the various computing devices and/or systems described herein may be executed on one or more virtual machines executed at one or more server computing machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine as well as the interface with the host operating system (i.e., operating system 614). A software architecture executes within the virtual machine such as an operating system 650, libraries 652, frameworks/middleware 654, applications 656 and/or presentation layer 658. These layers of software architecture executing within the virtual machine 648 can be the same as corresponding layers previously described or may be different.

Figure 7:
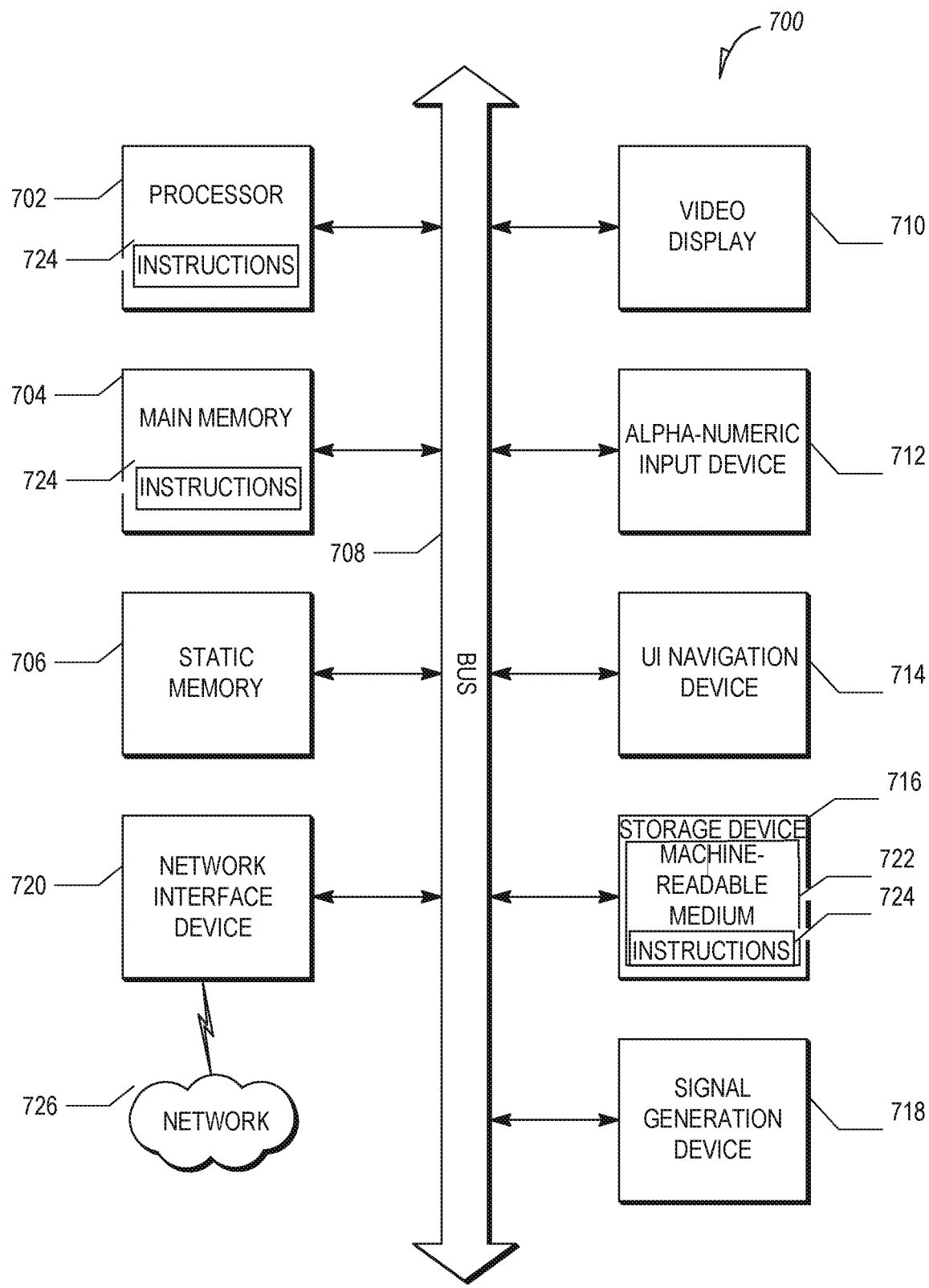
FIG. 7 is a block diagram illustrating a computing device hardware architecture, within which a set or sequence of instructions can be executed to cause the machine to perform examples of any one of the methodologies discussed herein.

FIG. 7 is a block diagram illustrating a computing device hardware architecture 700, within which a set or sequence of instructions can be executed to cause the machine to perform examples of any one of the methodologies discussed herein. For example, the architecture 700 may execute the software architecture 602 described with respect to FIG. 6. The architecture 700 may operate as a standalone device or may be connected (e.g., networked) to other machines. In a networked deployment, the architecture 700 may operate in the capacity of either a server or a client machine in server-client network environments, or it may act as a peer machine in peer-to-peer (or distributed) network environments. The architecture 700 can be implemented in a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine.

Example architecture 700 includes a processor unit 702 comprising at least one processor (e.g., a central processing unit (CPU), a graphics processing unit (GPU) or both, processor cores, compute nodes, etc.). The architecture 700 may further comprise a main memory 704 and a static memory 706, which communicate with each other via a link 708 (e.g., bus). The architecture 700 can further include a video display unit 710, an alphanumeric input device 712 (e.g., a keyboard), and a user interface (UI) navigation device 714 (e.g., a mouse). In some examples, the video display unit 710, input device 712 and UI navigation device 714 are incorporated into a touch screen display. The architecture 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 can also reside, completely or at least partially, within the main memory 704, static memory 706, and/or within the processor 702 during execution thereof by the architecture 700, with the main memory 704, static memory 706, and the processor 702 also constituting machine-readable media. Instructions stored at the machine-readable medium 722 may include, for example, instructions for implementing the software architecture 602, instructions for executing any of the features described herein, etc.

While the machine-readable medium 722 is illustrated in an example to be a single medium, the term "machine-readable medium" can include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 can further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An automated system for providing responsive content to a user associated with a user account, the system comprising:
   an analytics system comprising at least one processor and a memory in communication with the at least one processor, wherein the analytics system is configured to perform operations to:
   receive support communication data describing a support communication regarding the user account, the support communication received from a user computing device;
   upon receipt of the support communication, automatically determine a subject of the support communication based at least in part on an evaluation of internet browsing history data corresponding to the user account and transaction data corresponding to the user account;
   automatically select a response medium based at least in part on the determined subject of the support communication; and
   send a response message for the subject via the automatically selected response medium.

2. The system of claim 1, wherein the internet browsing history data describes a plurality of queries from the user account and descriptions of content included in webpages visited using the user account.

3. The system of claim 1, wherein the transaction data describes a plurality of transactions on at least one financial account associated with the user account.

4. The system of claim 1, wherein to determine the subject of the support communication the analytics system is further configured to perform operations to:
   compare the support communication data to events included in the internet browsing history data and the transaction data that have occurred within a threshold time before receiving the support communication to determine that the support communication does not have a likely short-term subject;
   determine a lifecycle value that indicates a range of ages describing the user based at least in part on the transaction data; and
   return the lifecycle value as the subject of the support communication.

5. The system of claim 1, wherein the support communication is a phone call, further comprising a computer telephony integration (CTI) system in communication with the analytics system, wherein to select the response medium the analytics system is further configured to perform operations to:
   determine that a first customer support representative is associated with the subject at a customer support representative database; and
   send to the CTI system an instruction to route the phone call to a first customer support representative device associated with the first customer support representative.

6. The system of claim 1, wherein the analytics system is implemented by a first financial institution, and wherein the analytics system is further configured to perform operations to:
   receive portfolio data describing a plurality of financial accounts held by the user account; and
   determine based at least in part on the portfolio data that a user associated with the user account is likely to hold a financial account at a second financial institution, wherein the response message comprises offer data describes an offered financial account.

7. The system of claim 1, wherein the analytics system is further configured to perform operations to:
   determine a preemptive resolution to the support communication;
   send an instruction to an account management system to implement the preemptive resolution; and
   incorporate an indication of the preemptive resolution into the response message.

8. At least one non-transitory machine-readable medium including instructions for providing responsive content to a user associated with a user account that, when executed by at least one processor, cause the at least one processor to perform operations to:
   receive support communication data describing a support communication regarding the user account, the support communication received from a user computing device;
   upon receipt of the support communication, automatically determine a subject of the support communication based at least in part on an evaluation of internet browsing history data corresponding to the user account and transaction data corresponding to the user account;
   automatically select a response medium based at least in part on the determined subject of the support communication; and send a response message for the subject via the automatically selected response medium.

9. The at least one non-transitory machine-readable medium of claim 8, wherein the internet browsing history data describes a plurality of queries from the user account and descriptions of content included in webpages visited using the user account.

10. The at least one non-transitory machine-readable medium of claim 8, wherein the transaction data describes a plurality of transactions on at least one financial account associated with the user account.

11. The at least one non-transitory machine-readable medium of claim 8, wherein the instructions to determine the subject of the support communication include instructions to:
   compare the support communication data to events included in the internet browsing history data and the transaction data that have occurred within a threshold time before receiving the support communication to determine that the support communication does not have a likely short-term subject;
   determine a lifecycle value that indicates a range of ages describing the user based at least in part on the transaction data; and
   return the lifecycle value as the subject of the support communication.

12. The at least one non-transitory machine-readable medium of claim 8, wherein the support communication is a phone call received via a computer telephony integration (CTI) system, and wherein the instructions to select the response medium include instructions to:
   determine that a first customer support representative is associated with the subject at a customer support representative database; and
   send to the CTI system an instruction to route the phone call to a first customer support representative device associated with the first customer support representative.

13. The at least one non-transitory machine-readable medium of claim 8, further comprising instructions to:
   receive portfolio data describing a plurality of financial accounts held by the user account; and
   determine based at least in part on the portfolio data that a user associated with the user account is likely to hold a financial account at a second financial institution, wherein the response message comprises offer data that describes an offered financial account.

14. The at least one non-transitory machine-readable medium of claim 8, further comprising instructions to:
   determine a preemptive resolution to the support communication;
   send an instruction to an account management system to implement the preemptive resolution; and
   incorporate an indication of the preemptive resolution into the response message.

15. A method for providing responsive content to a user associated with a user account comprising:
   receiving support communication data describing a support communication regarding the user account, the support communication received from a user computing device;
   upon receipt of the support communication, automatically determining a subject of the support communication based at least in part on an evaluation of internet browsing history data corresponding to the user account and transaction data corresponding to the user account;
   automatically selecting a response medium based at least in part on the determined subject of the support communication; and
   sending a response message for the subject via the automatically selected response medium.

16. The method of claim 15, wherein the internet browsing history data describes a plurality of queries from the user account and descriptions of content included in webpages visited using the user account.

17. The method of claim 15, wherein the transaction data describes a plurality of transactions on at least one financial account associated with the user account.

18. The method of claim 15, determining the subject of the support communication further comprising:
   comparing the support communication data to events included in the internet browsing history data and the transaction data that have occurred within a threshold time before receiving the support communication to determine that the support communication does not have a likely short-term subject;
   determining a lifecycle value that indicates a range of ages describing the user based at least in part on the transaction data; and
   returning the lifecycle value as the subject of the support communication.

19. The method of claim 15, wherein the support communication is a phone call received via a computer telephony integration (CTI) system, and selecting the response medium further comprising:
   determining that a first customer support representative is associated with the subject at a customer support representative database; and
   sending to the CTI system an instruction to route the phone call to a first customer support representative device associated with the first customer support representative.

20. The method of claim 15, further comprising:
   receiving portfolio data describing a plurality of financial accounts held by the user account; and
   determining based at least in part on the portfolio data that a user associated with the user account is likely to hold a financial account at a second financial institution, wherein the response message comprises offer data that describes an offered financial account.

21. The method of claim 15, further comprising:
   determining a preemptive resolution to the support communication;
   sending an instruction to an account management system to implement the preemptive resolution; and
   incorporating an indication of the preemptive resolution into the response message.

* * * * *